United States Patent
Dodda (10) Patent No.: US 9,443,257 B2
(45) Date of Patent: Sep. 13, 2016

(54) SECURING EXPANDABLE DISPLAY ADVERTISEMENTS IN A DISPLAY ADVERTISING ENVIRONMENT

(75) Inventor: Rampradeep Dodda, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 566 days.

(21) Appl. No.: 12/909,231

(22) Filed: Oct. 21, 2010

(65) Prior Publication Data
US 2012/0101907 A1    Apr. 26, 2012

(51) Int. Cl.
*G06Q 30/02* (2012.01)

(52) U.S. Cl.
CPC ...... *G06Q 30/0277* (2013.01); *G06Q 30/0276* (2013.01); *G06Q 30/0241* (2013.01)

(58) Field of Classification Search
CPC .......... G06Q 30/0241–30/0277; G06Q 30/02
USPC .................. 705/14.4, 14.72, 14.73
See application file for complete search history.

(56) References Cited

U.S. PATENT DOCUMENTS

| | | | | |
|---|---|---|---|---|
| 7,430,712 B2* | 9/2008 | Arokiaswamy | | 715/234 |
| 7,509,658 B2* | 3/2009 | Goring et al. | | 719/328 |
| 7,536,641 B2* | 5/2009 | Rosenstein et al. | | 715/234 |
| 7,809,785 B2* | 10/2010 | Appleton | | G06Q 30/02 709/201 |
| 8,156,494 B2* | 4/2012 | Zhou | | G06F 9/4428 707/756 |
| 8,423,901 B2* | 4/2013 | D'Entremont et al. | | 715/788 |
| 9,202,231 B2* | 12/2015 | Kim | | G06Q 30/02 |
| 2002/0022989 A1* | 2/2002 | Endo et al. | | 705/14 |
| 2004/0046799 A1* | 3/2004 | Gombert et al. | | 345/781 |
| 2006/0259859 A1* | 11/2006 | Ivarsoy et al. | | 715/520 |
| 2009/0006214 A1* | 1/2009 | Lerman et al. | | 705/14 |
| 2009/0070190 A1* | 3/2009 | Gorty et al. | | 705/10 |
| 2009/0172551 A1* | 7/2009 | Kane | | G06Q 30/02 715/733 |
| 2009/0177538 A1* | 7/2009 | Brewer et al. | | 705/14 |
| 2009/0299862 A1* | 12/2009 | Fan et al. | | 705/14.73 |
| 2009/0300496 A1* | 12/2009 | Fan et al. | | 715/711 |
| 2009/0327869 A1* | 12/2009 | Fan et al. | | 715/240 |
| 2010/0058293 A1* | 3/2010 | Dunagan et al. | | 717/116 |
| 2010/0070288 A1* | 3/2010 | Pandey et al. | | 705/1 |
| 2010/0203934 A1* | 8/2010 | Hahn et al. | | 463/2 |
| 2010/0251095 A1* | 9/2010 | Juvet et al. | | 715/234 |
| 2011/0161990 A1* | 6/2011 | Smith et al. | | 719/328 |
| 2011/0225540 A1* | 9/2011 | d'Entremont et al. | | 715/786 |

FOREIGN PATENT DOCUMENTS

WO    WO00/19332    *    4/2000    ............. G06F 17/00

* cited by examiner

*Primary Examiner* — Bennett Sigmond
(74) *Attorney, Agent, or Firm* — Mauriel Kapouytian Woods LLP; Lawrence R. Gabuzda; James Woods (57) ABSTRACT

A method for securely presenting an HTML expandable display advertisement on a computer display, comprising: storing at a serving computer, an HTML object having an identifier associated with at least one securing computer, registering at the securing computer, the expandable display advertisement, and signaling, from a displaying computer, an expansion event for the expandable display advertisement wherein the expandable display advertisement is for display on the displaying computer. Additional operations for securely presenting an expandable display advertisement on a computer display include expanding, at the displaying computer, the expandable display advertisement; and signaling, from a displaying computer, a restoring event. Using this technique, the serving computer may be within a first domain, and the securing computer within a second domain, the second domain being different from the first domain. In some cases, a registration message received by a securing computer comprises width and height dimensions of the expandable display advertisement.

20 Claims, 8 Drawing Sheets

SECURING EXPANDABLE DISPLAY ADVERTISEMENTS IN A DISPLAY ADVERTISING ENVIRONMENT

FIELD OF THE INVENTION

The present invention is directed to Internet display advertising. More particularly, the present invention is directed to securing expandable display advertisements in a display advertising environment.

BACKGROUND OF THE INVENTION

In current Internet-based ad-serving environments, a publisher webpage showing display advertisements are vulnerable to security threats from advertisement code that runs within the same publisher domain. Some of the common threats include compromising user cookies or data, compromised access to publisher content and a wide range of attacks possible through cross-site scripting. The only practical approach that exists within the current browser standards to prevent xss (cross site scripting) or other cross site scripting or sandboxing against user data and other security vulnerabilities is to host the display advertisement in a separate web document (e.g. in an inline frame, iFrame, iframe, or IFRAME) based out of a different domain, taking advantage of the "same origin policy" enforced by browser standards which restrict scripting access across domains. This model works well for regular display advertisements however poses problems when hosting expandable advertisements, expandable advertisements can expand from their initial dimensions dynamically based on time and/or user interactions. The expansion resizing poses problems when an expandable advertisement is hosted within an iframe. When the expansion resizing takes place, the advertisement is clipped by the bounding iframe—breaking the ad experience. Thus, currently, publisher pages end up hosting expandable advertisements within the same domain as the publisher in order to overcome the resizing restrictions imposed by iframe based ad-serving. Thus there is need to solve this industry wide problem of securing expandable display advertisements, and improvements are needed for the purpose of safely supporting expandable rich media display advertisements within iFrames.

SUMMARY OF THE INVENTION

To overcome the restrictions imposed by inline frames on expandable advertisement, embodiments presented herein describes in detail a method for securely presenting an expandable display advertisement on a publisher page. Techniques comprise of the following steps.
1) The publisher page hosts an ad-iframe based on different domain showing the expandable ad.
2) A secure cross-domain messaging pipeline is established between the ad-iframe and the publisher document.
3) The ad iframe contains an expandable iframe API which sends messages to the messaging pipeline, using which messages the adcode can notify the script on the publisher domain to resize the ad-iframe when required.
4) The publisher page includes corresponding expandable iframe library which listens on the messaging pipeline and resizes the ad iframe upon receiving the resize message from the secure pipeline.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
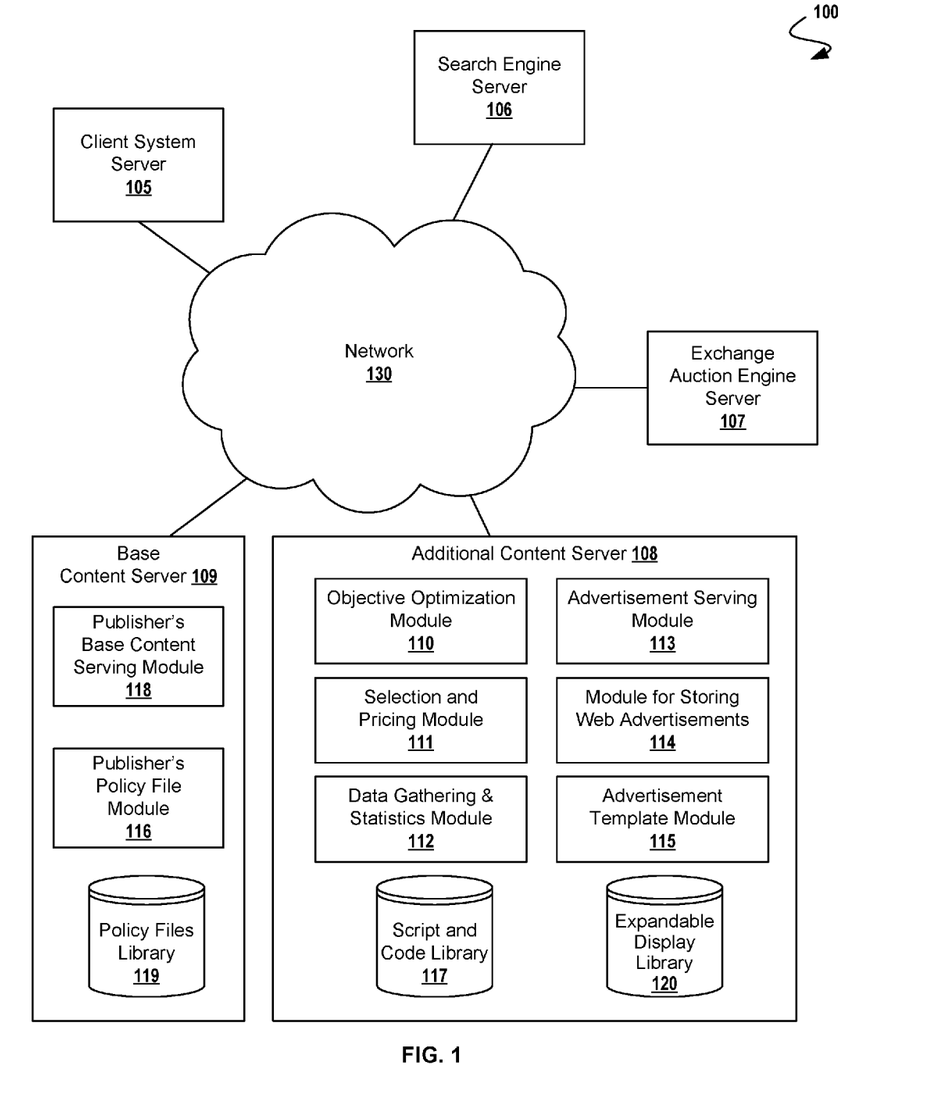
FIG. 1 depicts an advertising server network environment including modules for implementing a system and method for securing expandable display advertisements in a display advertising environment, in which some embodiments operate.

FIG. 1 depicts an advertising server network environment including modules for implementing a system and method for securing expandable display advertisements in a display advertising environment. The advertising server network environment implements a system for delivery of display advertising. In the context of Internet advertising, placement of advertisements within an Internet environment (e.g. environment 100 of FIG. 1) has become common and, more specifically, placement of advertisements within an iFrame has also become common. By way of a simplified description, an Internet advertiser may select a particular Internet publisher (e.g. Yahoo.com/Finance, or Yahoo.com/Search), and may create an advertisement such that whenever any Internet user, via a client system 105 renders the web page from the selected property, possibly using a search engine server 106, the advertisement is composited on a web page by one or more servers (e.g. base content server 109, additional content server 108) for delivery to a client system 105 over a network 130. Given this generalized delivery model, and using techniques disclosed herein, sophisticated online advertising might be practiced. More particularly, an advertising campaign might include highly customized advertisements delivered to a user using any of a variety of attention-getting display techniques including expandable iFrames. Again referring to FIG. 1, an Internet property (e.g. a publisher hosting the publisher's base content serving module 118 on a base content server 109) might present the publisher's base content from a server hosted at the publisher's facilities (or at a facility controlled by the publisher). Conversely, an additional content server 108 might provide advertisements using an advertisement serving module 113 hosted from a server hosted at an advertising network operator's facilities (or at a facility controlled by the advertising network operator). As earlier described, the advertisement might be presented in an iFrame (or more specifically within an expandable iFrame) that appears within a portion of the page presented to a user, which page is composited to include both the publisher's base content and also the advertiser's ad content (e.g. retrieved using a module for storing web advertisements 114). Thus, a protocol for compositing and displaying an advertisement using an expandable display advertisement might include retrieving content from the publisher's domain as well as retrieving content from the advertising network operator's domain.

In some embodiments, the environment 100 might host a variety of advertising network operator modules to serve advertising management and control operations (e.g. an objective optimization module 110, a selection and pricing module 111, a data gathering and statistics module 112, an advertisement serving module 113, a module for storing web advertisements 114, an advertisement template module 115, a script and code library 117, etc). Similarly, in some embodiments, the environment 100 might host a variety of modules to serve publishing management and control operations (e.g. a publisher's base content serving module 118, a publisher's policy file storage module 116, a policy file library 119, an expandable display library 120, etc).

In particular, the modules, network links, algorithms, assignment techniques, serving policies, and data structures embodied within the environment 100 might be specialized so as to perform a particular function or group of functions reliably while observing capacity and performance requirements. For example, an additional content server 108, possibly in conjunction with a base content server 109, might be employed to implement a scheme for securing expandable display advertisements in a display advertising environment. In another example, an additional content server 108, possibly in conjunction with an exchange auction engine server 107, might be employed to implement a scheme for securing expandable display advertisements in a display advertising environment, namely in a display advertising environment where advertisements are placed in an impression on the basis of auction bidding.

Figure 2:
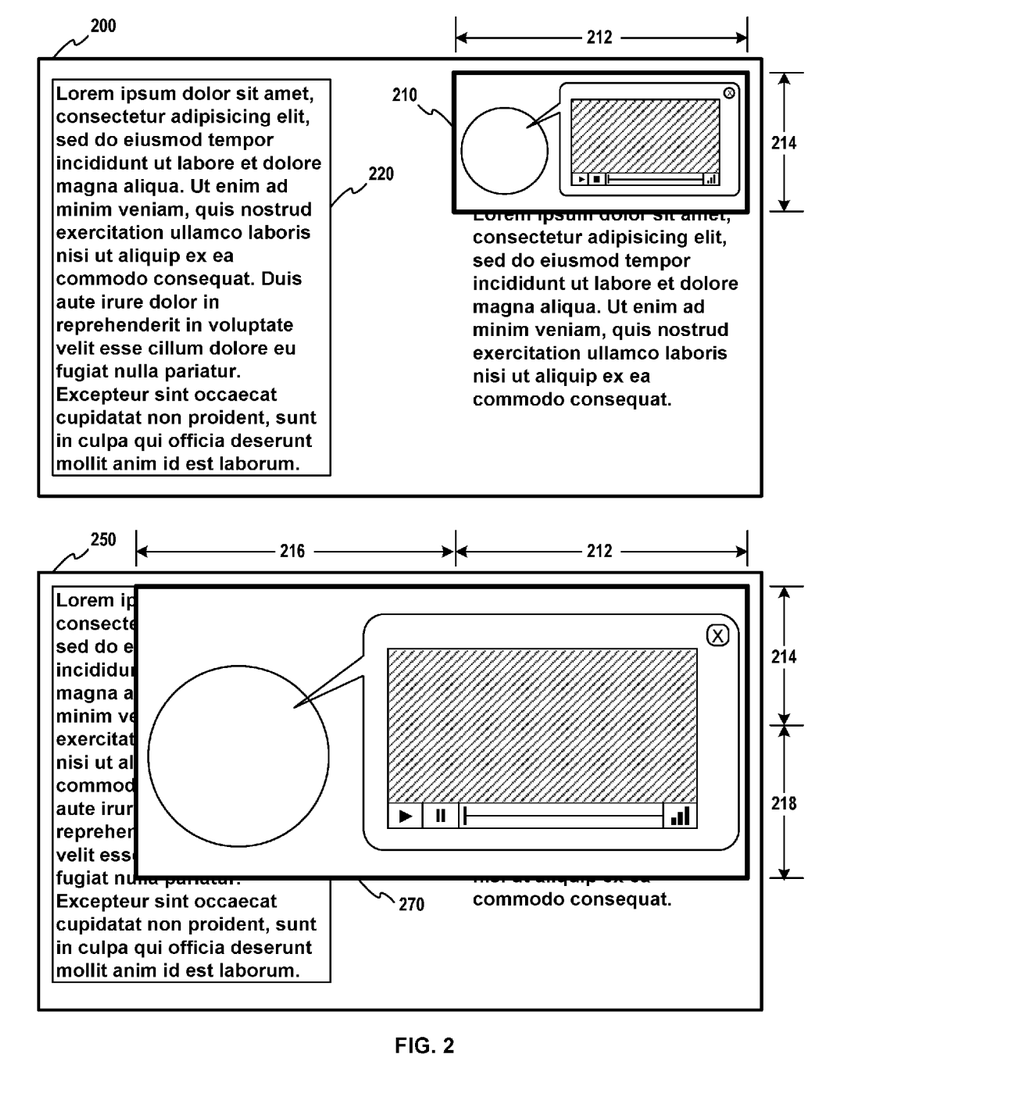
FIG. 2 is a schematic representation of an advertisement within an iFrame and an advertisement within an expandable iFrame, according to one embodiment.

FIG. 2 is a schematic representation of an advertisement within an iFrame and an advertisement within an expandable iFrame. The embodiment shown is purely exemplary, and might be implemented in the context of any of the embodiments described herein. As shown, a web page 200 might be composited to include an expandable display advertisement 210 placed within the border of the web page 200. Such a web page 200 might also include other areas, possibly including one or more text areas 220 and/or one or more graphic areas. Similarly, the content of an expandable display advertisement 210 might include any combination of text, audio or video objects, text devices, or any other screen devices for that matter. As shown, the expandable display advertisement 210 is bounded by an initial width of the expandable display advertisement 212, and an initial height of the expandable display advertisement 214. Also shown are an exemplary width delta expansion dimension 216 of the expandable display advertisement and a height delta expansion dimension 218 of the expandable display advertisement.

Upon some event (e.g. an expansion event), an expandable display advertisement 210 might become expanded; thus, an expanded iFrame 270 is rendered within the iFrame-laden web page 250.

Security Threats Involving Expandable iFrames

Given the security threats as described above, and the current state of ad-serving technology, both the publisher's servers as well as the advertising network servers (as well as the ads themselves) are vulnerable to threats. The severities of these threats are exacerbated in environments that implement an exchange auction engine server 107, or other dynamic bidding/exchange marketplaces where there tends to be lesser control over the characteristics of the advertisements, and would thus be potentially further open to threats—including threats launched by malicious publishers acting on an incentive to siphon revenue.

One safe approach available with the current browser standards to prevent most of the security vulnerabilities resulting from running of advertisement code within the publisher domain is to serve the ads within the confines of an iFrame. Although this safe approach satisfies the "same origin policy" enforced by browser standards (wherein the ad content within an iFrame and the publisher's page fetched from different domains cannot access/affect one another), it is imbued with undesirable limitations. Specifically, although such an ad-serving setup can be implemented for serving a wide variety of types of ads, even including ads with rich media and/or interactive components, the approach poses problems with expandable ads, wherein the ads would dynamically expand from their initial ad sizes based on time-based events and/or events from user interactions. In normal operation, an expandable ad is clipped (i.e. not expanded) by the containing iFrame. Then, upon user actions, the HTML embedded within the advertisement executes code to expand the iFrame to a size larger than the initially composited iFrame. As highlighted above, this act of executing code to expand the iFrame to a size larger than the initially composited iFrame exposes the user's machine to the aforementioned security risk.

Thus there is a need to solve this industry-wide problem of securing expandable ads. Further, there is significant motivation for a high performance solution to hosting ads within expandable iFrames. In the context of a system for securing expandable iFrames in a display advertising environment, high performance means (1) the scheme provides for operation of expandable ads, (2) the scheme addresses the aforementioned security risks, (3) the scheme addresses high performance rendering of the publisher's page (e.g. using non-blocking rendering), and (4) the scheme addresses achieving publisher page load service level agreements (SLAs) by (for example) performing parallel loading of the ad assets (e.g. from additional content server 108) and the page assets (e.g. from base content server 109).

Technique Overview

Technique: Using postMessage Communication from within Browsers

The postMessage technique was drafted into the HTML5 specification, and all major browser vendors implemented this standard in their versions supporting HTML5.

Using the HTML5 window.postMessage facilitates safely enabling cross-origin communication. Normally, scripts on different pages/domains are only allowed to access each other if and only if the pages which executed them are at locations with the same protocol (usually both http), port number (80 being the default for http), and host (modulo document.domain being set by both pages to the same value). The window.postMessage provides a controlled mechanism to circumvent this restriction in a way which is secure when properly used.

Technique: Using URL Fragment Communication

For the older browsers that don't support the HTML5 postmessage standard, the uniform resource locator (URL) fragment communication technique of the present invention uses an efficient, non-polling implementation for grandparent-grandchild communication.

Technique Detail

The two aforementioned techniques implement a standard/secure and efficient cross-domain communication infrastructure for communication between the publisher page hosting the expandable advertisement and the iFrame wrapping the expandable advertisement. Additional embodiments and details are presented below.

Technique: postMessage Communication Implementing an API

In one embodiment, an API relies on postMessage communication in order to communicate messages across browser windows from different domains (this includes frames, iFrames, and pop-ups). Message content may be formatted into simple string-based messages.

Figure 3:
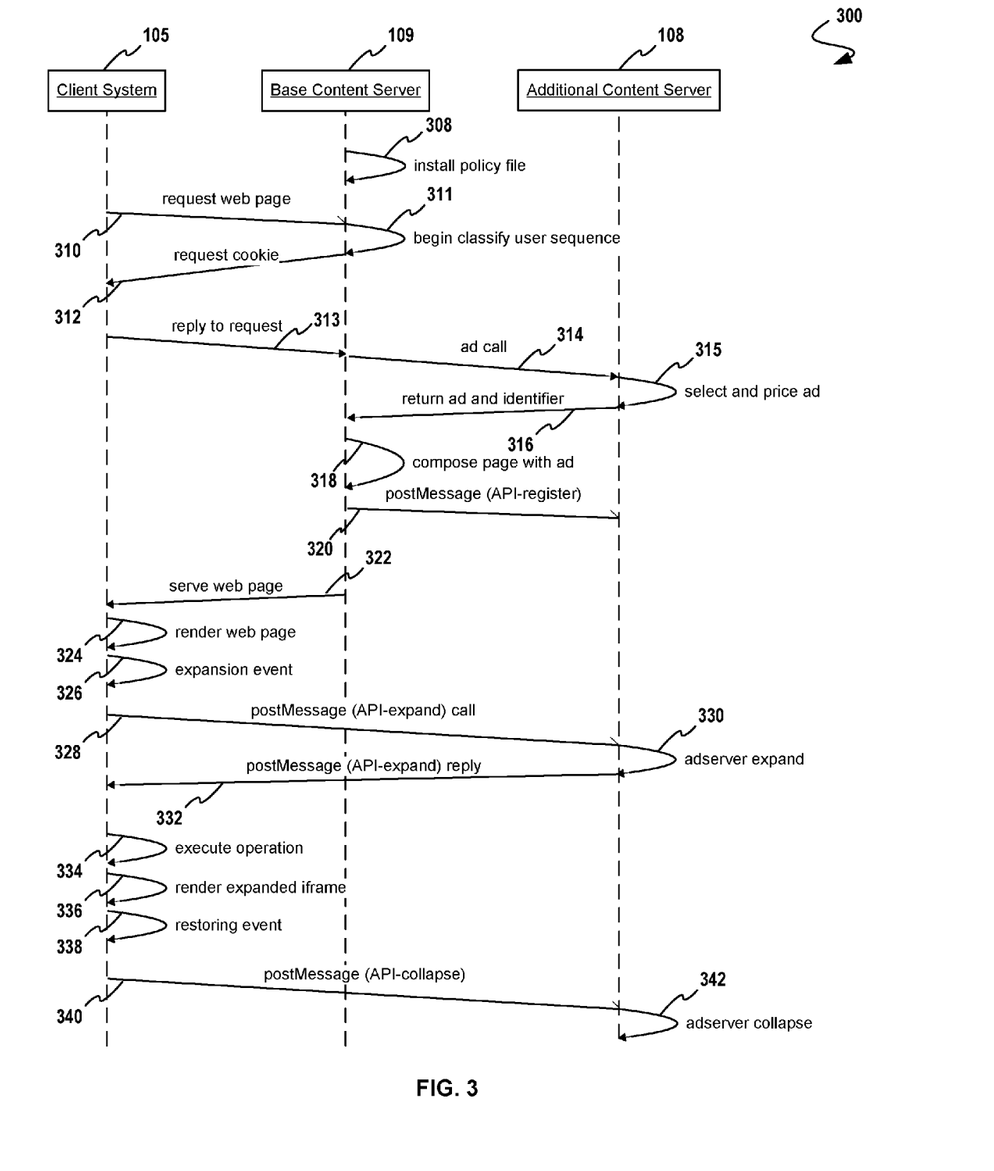
FIG. 3 is a diagrammatic representation of several computer systems in the exemplary form of a client-server network, according to one embodiment.

FIG. 3 is a diagrammatic representation of several computer systems (i.e. a client system 105, a base content server 109, and an additional content server 108 (e.g. an ad server) in the exemplary form of a client-server network 300 within which network a communication protocol for securing expandable iFrames in a display advertising environment may be executed. The embodiment shown is purely exemplary, and might be implemented in the context of any of the embodiments described herein. As shown, a user from a client system 105 might navigate to a website and request a web page (see message 310). Possibly, prior to sending a reply to the request (see message 313), the base content server might perform one or more operations to classify a user (see classify user sequence operation 311). Such operations might include requesting information from the client system (see request cookie message 312). In this embodiment, the base content server generates an ad call (see message 314) to request from an additional content server an advertisement to be displayed when serving the requested page; the ad call message 314 may include information about the user and/or the user's system as may have been obtained by earlier messages or operations (e.g. from the request cookie message 312 and ensuing exchange). The additional content server 108 may then, possibly in conjunction with an exchange auction engine server 107, select and price an ad spot, possibly using a selection and pricing module 111 (see select and price ad operation 315), and return to the ad call requester (in this case the base content server 109 of the publisher) via a return ad message (see return ad and identifier message 316). At this point in the shown embodiment, the base content server has sufficient components to compose the requested page to be then served to the requesting user at the client system. In particular, the return ad and identifier message 316 contains enough information to facilitate the storing (within the base content server's computer memory), an HTML object (e.g. an advertisement) having an identifier (e.g. a URL, a URI), the identifier describing or otherwise associated with the additional content server.

For example, the identifier might uniquely identify an object (e.g. some HTML code), or a hierarchy (e.g. a link), or any arbitrary resource. Further, since the base content server has the necessary components to compose the requested page to be then served to the requesting user at the client system, the base content server 109 might compose the requested page, including the advertisement (see compose page with ad message 318).

In some embodiments of the invention, the base content server may register the aforementioned HTML object (e.g. an advertisement including an expandable display advertisement) with the additional content server using an API call, possibly using an HTML5 postMessage messaging technique (see registration message 320). Using such a technique, i.e. specifically invoking an API call, the base content server effectively registers, at the additional content server, the expandable display advertisement. As shown in FIG. 3 and as further described herein, the registering actions comprise sending a message from the base content server to the additional content server, and receiving the sent message at the additional content server. In exemplary embodiments, the message comprises an initial width (e.g. size in pixels) of the expandable display advertisement and an initial height (e.g. size in pixels) of the expandable display advertisement.

Continuing the description of this embodiment, the base content server serves the requested web page to the requesting client system (see serve web page message 322), which client system renders the web page at the client system (see operation render web page 324). As is typical with user navigation on and through web pages, the user may take some action (e.g. mouse movement, mouse hovering, mouse clicks, keystrokes, screen touch/multi-touch, etc), which action (see expansion event 326) in some cases may indicate user interest in some aspect of the web page (e.g. interest in the served advertisement including an expandable display advertisement). Surmounting the limitations as heretofore described, a message, possibly an API-expand call message 328 is sent from the client system 105 to the additional content server 108, in effect signaling a request for an expansion event to be applied to the expandable display advertisement being displayed on the user's client system (see API-expand call message 328). The additional content server receives such an API-expand call message 328, and in response to such a message, performs various processing actions (see adserver expand operation 330). The actions might include, but are not limited to, resizing the display advertisement, recomposing the contents of the display advertisement, and/or recording the event for subsequent analysis. According to the specific actions taken (see adserver expand operation 330), the adserver may reply to the API-expand call message (see API-expand reply message 332). In one embodiment, the API-expand reply message 332 includes text comprising one or more HTML objects, which objects are in turn used in the display of the expandable display advertisement (see execute operation 334). Of course, the adserver may reply to the API-expand call message (see API-expand reply message 332) with one or more HTML objects; however, the adserver may reply to the API-expand call message 328 with other instructions that may not apply to any specific rendering operation, and instead may apply to any non-rendering client system operation (see execute operation 334). Nevertheless, in the embodiment shown, the client system responds to the API-expand reply message 332 by resizing and rendering the expandable iFrame at the client system display (see render expanded iFrame operation 336).

The user may respond to the rendering operation (see render expanded iFrame operation 336), or any non-rendering operation (see execute operation 334) and, for example, may initiate user action (see restoring event 338) to cause the expandable iFrame to be restored to its original rendering. In such a case, the client system signals a restoring event (see API-collapse call 340), which message is received by the additional content server, which in turn causes the additional content server to perform a corresponding adserver collapse operation 342. It should be noted that the terms "expand" and "collapse" and "restore" are merely exemplary, and other syntactical terms and semantics are reasonable and envisioned.

The technique shown and described above does not require hosting of proxy files (e.g. possibly within a publisher's policy file storage module 116) on the publisher's domain. However, in alternative embodiments of the invention (further described below), a policy file might be installed within the publisher's domain (see install policy file operation 308).

Technique: URL Fragment Retrieval

The disclosed URL fragment technique serves for older browsers that don't support the HTML5 postMessage standard. In some embodiments, this URL fragment technique may be implemented using a non-polling, single-grandchild iFrame approach for efficient message communication. Of course, the disclosed URL fragment technique may be used with a uniform resource identifier (URI). This fragment technique may include hosting of a policy file on the publisher's domain (possibly using a publisher's policy file storage module 116). Using this technique, a plurality of versions corresponding to a plurality of renderings are present in the aforementioned HTML object. More particularly, the HTML object may contain fragments using the "#" fragment operator. Thus, rendering any one of a plurality of versions may be accomplished by referencing the fragment by name (e.g. using a URL or URI containing a syntactically correct "#<name>" indicator.

Implementation of the Expandable iFrame API for Ad Vendors

Based on the cross-domain messaging infrastructure heretofore described, exemplary embodiments may expose an API to ad vendors. Ad vendors (e.g. publishers or their agents) may use the API calls to register an expandable iFrame, and to communicate using the API events or requests to expand and/or collapse the expandable iFrame ad. In exemplary situations, a publisher or ad vendor might use an ad content generation system, which system would facilitate integration with the API.

What follows here are possible implementations of an API for securing expandable iFrames in a display advertising environment. Of course, what follows here is but one possible implementation for facilitating embodiments of the invention; other APIs are possible and envisioned.

Expandable iFrame API Call Overview: Register, Expand, Collapse

```
//Register the expansion specifications with the library
//Called at any time before the ad needs to expand
YAHOOads.vendor.ExpIframe.register(
   inital_width,
   inital_height,
   expand_x,
   expand_y);
//Expand iframe as per the registered configuration
//Called by ad-code just before the ad needs to expand
YAHOOads.vendor.ExpIframe.expand( );
//Restore iframe to initial state
//Called by ad-code after the ad collapses
YAHOOads.vendor.ExpIframe.collapse( );
```

Expandable iFrame API Call Synopsis: Register, Expand, Collapse

Register Call

YAHOOads.vendor.ExpIframe.register(inital_width, inital_height)

Summary:

Called by the expandable advertisement once per impression on the publisher's page before or upon load of the iFrame. Success results in registration of the expandable advertisement (i.e. registration of itself) and registration of the expandable iFrame wrapping the expandable advertisement with the code library. The parameters serve to pass the initial, unexpanded dimensions during registration.

Params:

initial_width: The width of the expandable iFrame in its unexpanded state.

initial_height: The height of the expandable iFrame in its unexpanded state.

Example:

An advertisement in an expandable iFrame having unexpanded dimensions of 300 pixels by 250 pixels would register as follows:

YAHOOads.vendor.ExpIframe.register(300,250);

Expand Call

YAHOOads.vendor.ExpIframe.expand(expand_x, expand_y)

Summary:

Expand the wrapping expandable iFrame by the delta expansion dimensions specified by expand_x and expand_y; to be called by the expandable iFrame just before the ad is to be expanded. If expanding towards the right and bottom, expand_x and expand_y are positive values. If expanding towards the left and top, expand_x and expand_y are negative values. Usually an expand call is in response to a user action (e.g. mouse click, mouse over, time-based event, etc). The call to this function causes the iFrame to expand to the expanded dimensions after which the wrapped advertisement can expand with or without animation within the bounds of the expanded iFrame.

Params:

expand_x: The delta expansion in the x-coordinate from the unexpanded position.

expand_y: The delta expansion in the y-coordinate from the unexpanded position.

Example:

An advertisement with unexpanded dimensions of 300 pixels by 250 pixels to be expanded 200 pixels (px) towards the left and 50 pixels towards the bottom to form a 500 pixel by 300 pixel area in the expanded state would signal an expansion request as shown in the following expand call:

```
YAHOOads.vendor.ExpIframe.expand(-200,50);
//Ad expanding left 200px and top 50px
```

Other example expand calls:

```
YAHOOads.vendor.ExpIframe.expand(200,-50);
   //Ad expanding right 200px and bottom 50px
YAHOOads.vendor.ExpIframe.expand(200,50);
   //Ad expanding right 200px and top 50px
YAHOOads.vendor.ExpIframe.expand(-200,-50);
   //Ad expanding left 200px and bottom 50px
```

Collapse Call
YAHOOads.vendor.ExpIframe.collapse( )
Summary:
   Restore the iFrame to the initial unexpanded state. To be called by the expandable iFrame, at which pointer the ad collapses from its expanded state to its unexpanded state. The call to this function causes the iFrame to resize the wrapping iFrame to its initial dimensions.
Example:
   An expandable iFrame would signal collapse as follows:
   YAHOOads.vendor.ExpIframe.collapse( );
Integration Overview
Ad Vendor Integration
   1. Publish and host the script and code library 117, possibly with corresponding expandable iFrame API documentation and expandable iFrame API call samples, and possibly including or in conjunction with an advertisement template module 115.
   2. Ad vendors integrate the expandable iFrame API with their advertisements, possibly using templates available in an ad generation system (e.g. a script and code library 117 and/or an advertisement template module 115). At ad serving time, any advertising network-specific code (e.g. an adtag code) implemented by the ad vendors might signal a request for expandable iFrame support. Some embodiments then dynamically request and receive code and other components (possibly from script and code library 117) for using the expandable iFrame API.
   3. Send API calls and receive API responses (possibly using the postMessage facility for communication of API calls and API replies).

Figure 4:
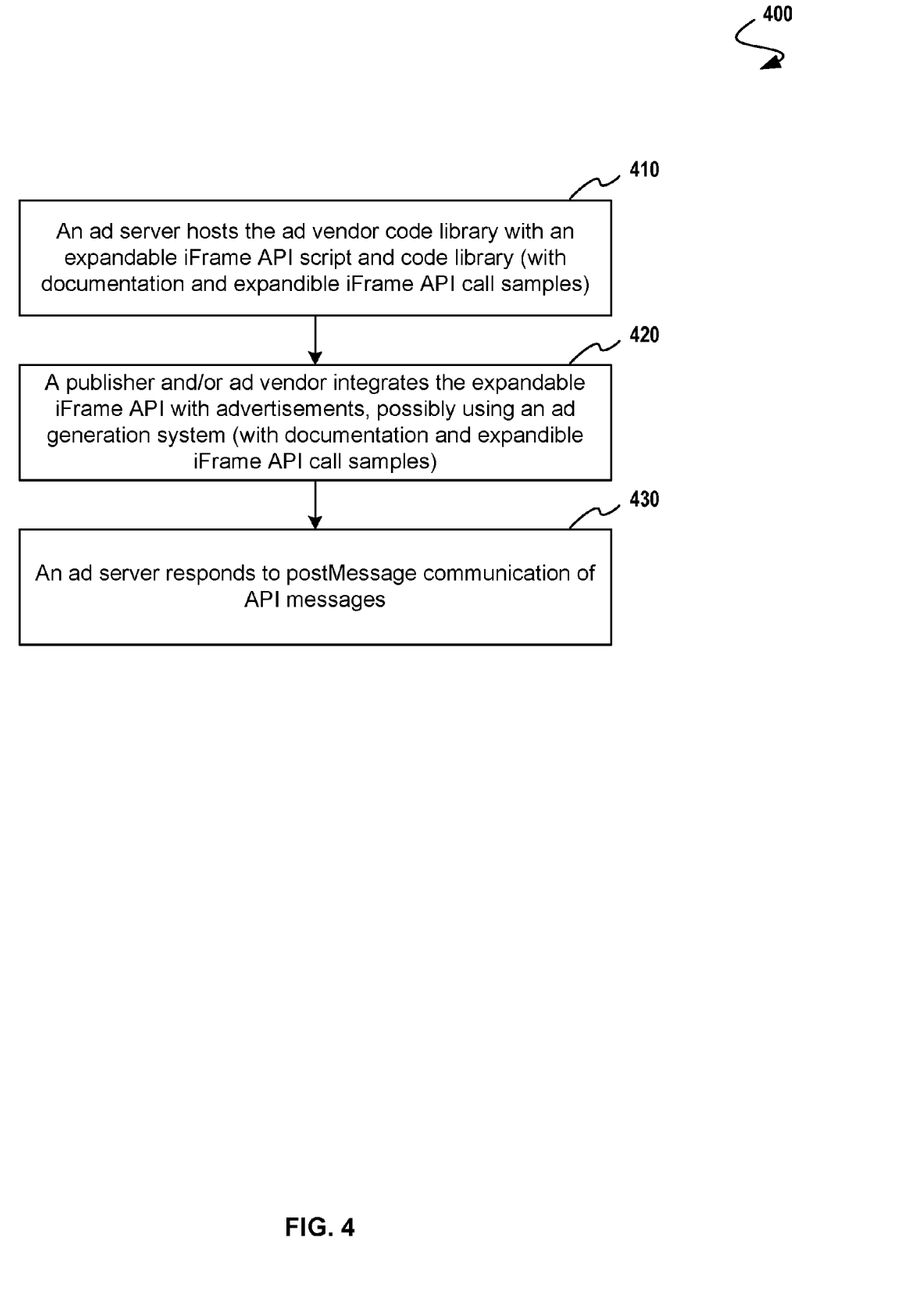
FIG. 4 is a flowchart of a method for hosting an ad server for securing expandable display advertisements in a display advertising environment, according to one embodiment.

FIG. 4 is a flowchart of a method for hosting an ad server for securing expandable iFrames in a display advertising environment. The embodiment shown is purely exemplary, and might be implemented in the context of any of the embodiments described herein. As shown, method 400 might begin with an operation where an ad server hosts the ad vendor code library with an expandable iFrame API script and code library 117, possibly including documentation and expandable iFrame API call samples, and possibly in conjunction with an advertisement template module 115 (see operation 410). In another operation (possibly concurrently executed with operation 410), a publisher and/or ad vendor integrates the expandable iFrame API with advertisements, possibly using an ad generation system, and possibly using templates available from an advertisement template module 115 (see operation 420). At the serving time an ad server responds to communication of API messages, possibly using postMessage communication techniques (see operation 430). Of course, the rendering of advertisements integrated with the expandable iFrames might occur as a result of the actions and messages as shown in FIG. 3 and as described above.

In other embodiments involving the URL fragment technique, a publisher hosts a proxy file (e.g. a policy file) on their domain in order to support browsers that do not support HTML5 postMessage functionality (e.g. older browsers) which browsers may instead use a URL fragment technique. In exemplary embodiments, serving systems (a publisher's base content server) might retrieve templates and/or other advertising containers that can automatically set up the environment for expandable iFrames. In such cases, the publisher would receive a proxy file (e.g. from an additional content server) and host the proxy file on the publisher's domain. Of course a publisher might also retrieve and host (e.g. on a base content server) a publisher's scripts and or executable code, which for example might be a components of a script and code library 117.

Figure 5:
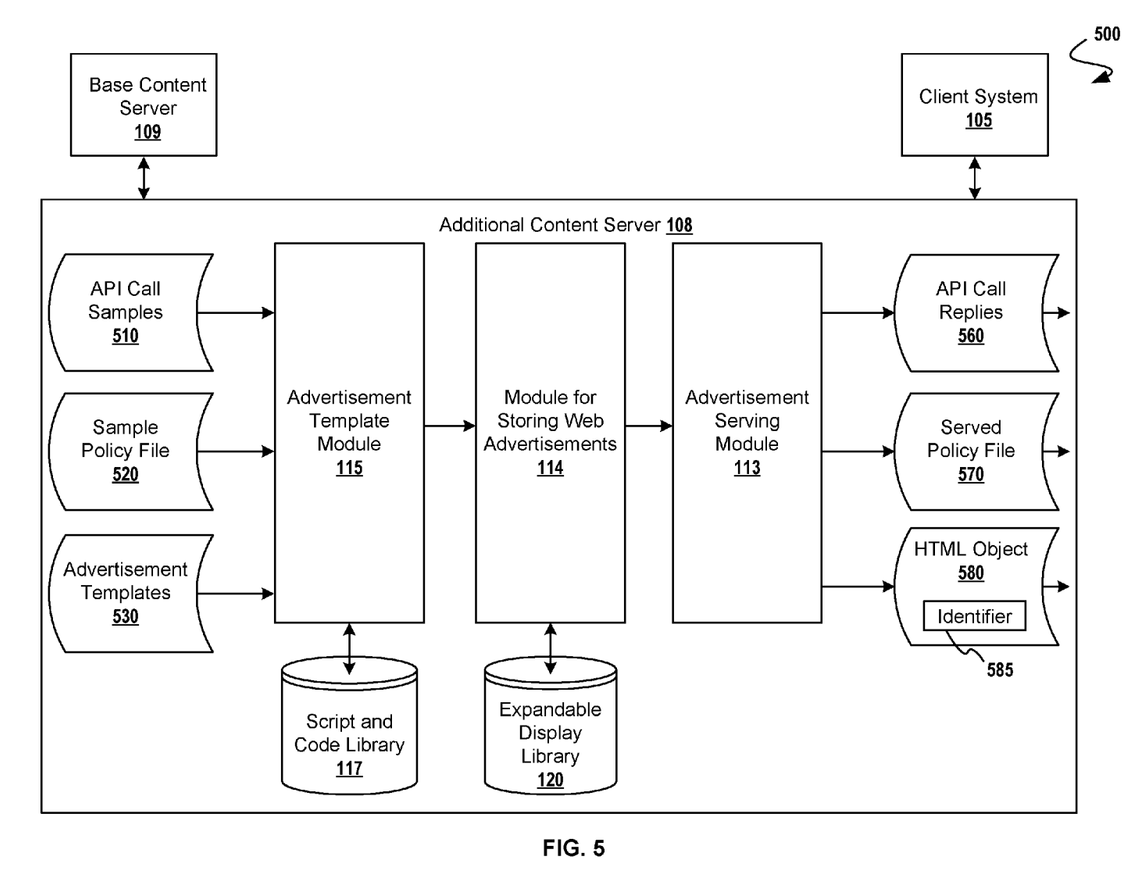
FIG. 5 is a block diagram of a system of subcomponents for securing expandable display advertisements in a display advertising environment, according to one embodiment.

FIG. 5 is a block diagram of a system of subcomponents 500 for securing expandable iFrames in a display advertising environment. As an option, the system of subcomponents 500 may be implemented in the context of the architecture and functionality of the embodiments described herein. Of course, however, the system of subcomponents 500 or any portion therefrom may be used in any desired environment. As shown, the system of subcomponents 500 comprises an exemplary embodiment of an additional content server 108 comprising an advertisement template module 115, a module for storing web advertisements 114, and an advertisement serving module 113, wherein the modules are working cooperatively for securing expandable iFrames in a display advertising environment. As shown, the advertisement template module 115 takes as inputs API call samples 510, a sample policy file 520, and one or more advertisement templates 530, which inputs are processed and stored in a computer memory or in nonvolatile storage within a script and code library 117 for later retrieval. Using any of the herein disclosed communication techniques for message passing and APIs, a base content server 109 and/or a client system 105 may communicate with the additional content server 108. Such communication may result in invocation of operations within the module for storing web advertisements 114 and, and in turn, one or more expandable iFrames (e.g. possibly stored within an expandable display library 120) may be configured and stored for later retrieval.

Certain modules of the system of subcomponents may perform operations at serving time. In particular, the advertisement serving module 113 might respond to requests (e.g. API calls) from a base content server 109 and/or a client system 105 for API call replies 560, which in exemplary cases may be sent with (i.e. together with, or along with) an HTML object 580, an identifier (e.g. HTML object identifier 585), and/or a served policy file 570.

Figure 6:
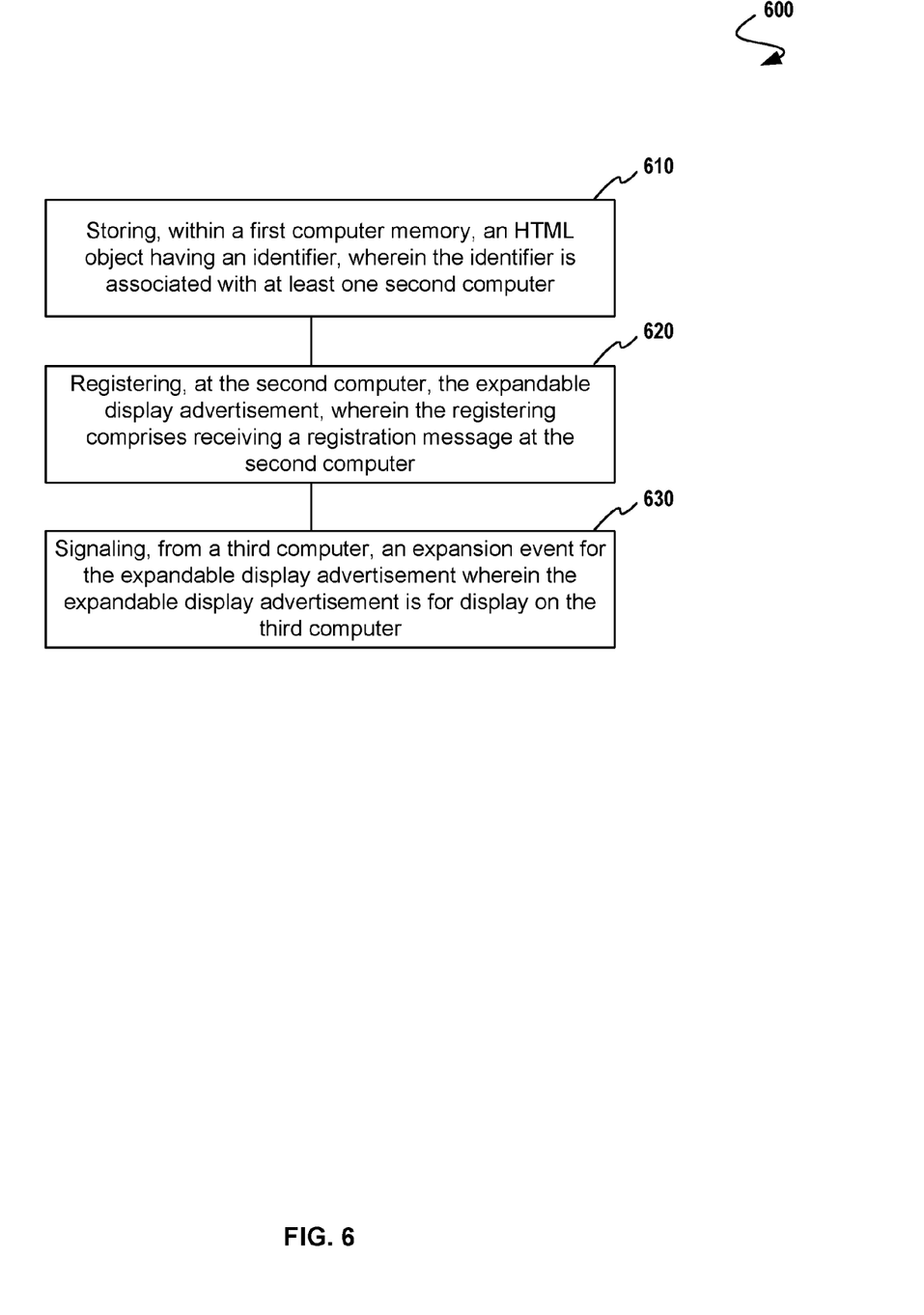
FIG. 6 depicts a block diagram of a method for presenting an expandable display advertisement on a computer display, according to one embodiment.

FIG. 6 depicts a block diagram of a method for presenting an expandable display advertisement on a computer display. As an option, the present method 600 may be implemented in the context of the architecture and functionality of the embodiments described herein. Of course, however, the method 600 or any operation therein may be carried out in any desired environment. The operations can, individually or in combination, perform method steps within method 600. Any method steps performed within method 600 may be performed in any order unless as may be specified in the claims. As shown, method 600 implements a method for presenting an expandable display advertisement on a computer display, the method 600 comprising storing, within a first computer memory, an HTML object having an identifier, wherein the identifier is associated with at least one second computer (see 610); registering, at the second computer, the expandable display advertisement, wherein the registering comprises receiving a registration message at the second computer (see 620); and signaling, from a third computer, an expansion event for the expandable display advertisement wherein the expandable display advertisement is for display on the third computer (see 630).

Figure 7:
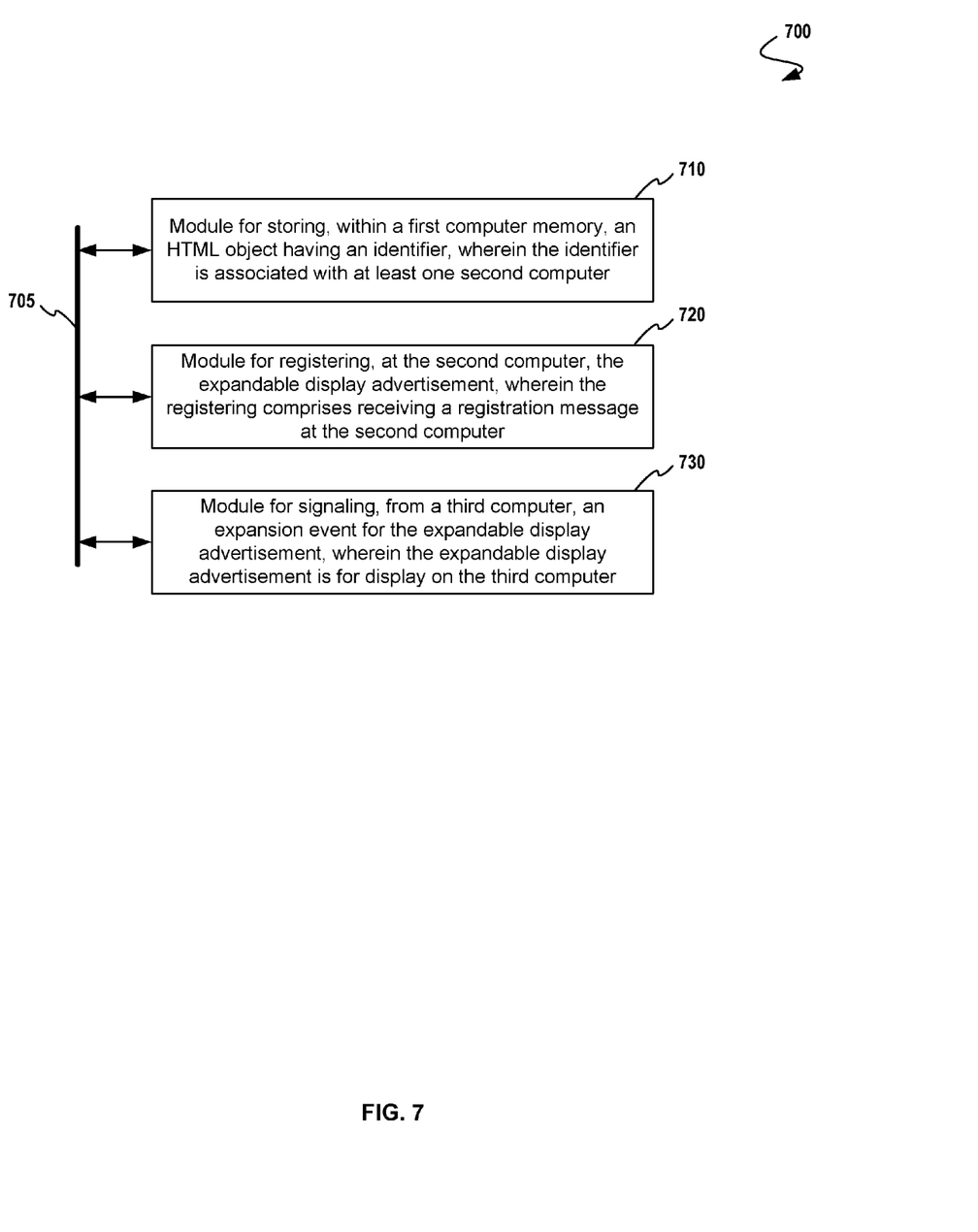
FIG. 7 depicts a block diagram of a system to perform certain functions of an advertising server network, according to one embodiment.

FIG. 7 depicts a block diagram of a system to perform certain functions of an advertising server network. As an option, the present system 700 may be implemented in the context of the architecture and functionality of the embodiments described herein. Of course, however, the system 700 or any operation therein may be carried out in any desired environment. As shown, system 700 comprises a plurality of modules, at least one module including at least one processor and a memory, each module connected to a communication link 705, and any module can communicate with any other module over communication link 705. The modules of the system can, individually or in combination, perform method steps within system 700. Any method steps performed within system 700 may be performed in any order unless as may be specified in the claims. As shown, FIG. 7 implements an advertising server network as a system 700, comprising modules including a module for storing, within a first computer memory, an HTML object having an identifier, wherein the identifier is associated with at least one second computer (see module 710); a module for registering, at the second computer, the expandable display advertisement, wherein the registering comprises receiving a registration message at the second computer (see module 720); and a module for signaling, from a third computer, an expansion event for the expandable display advertisement, wherein the expandable display advertisement is for display on the third computer (see module 730).

Embodiments of the present invention provide a secure environment to host advertisements within expandable iFrames including expandable rich media ads. Aspects of the present invention include:
  A single environment for securely serving textual, graphical, and/or expandable ads.
  Improved user experience due to non-blocking rendering of expandable ads.
  Improved overall page load SLA for loading publisher pages with ads.

Figure 8:
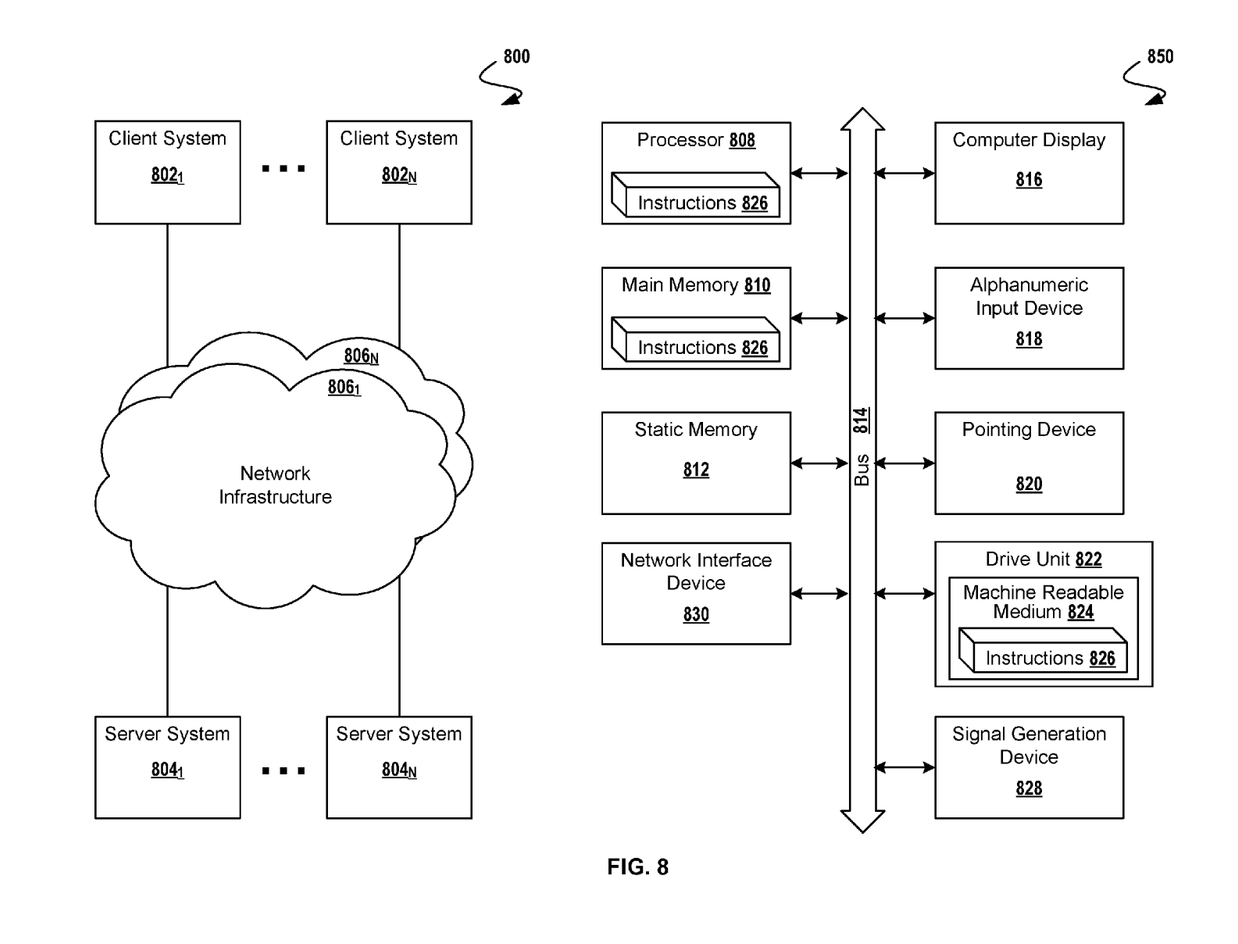
FIG. 8 is a diagrammatic representation of a network including nodes for client computers, and nodes for computer systems, according to one embodiment.

FIG. 8 is a diagrammatic representation of a network 800, including nodes for client computer systems 802$_1$ through 802$_N$, nodes for server computer systems 804$_1$ through 804$_N$, nodes for network infrastructure 806$_1$ through 806$_N$, any of which nodes may comprise a machine (e.g. computer 850) within which a set of instructions for causing the machine to perform any one of the techniques discussed above may be executed. The embodiment shown is purely exemplary, and might be implemented in the context of one or more of the figures herein.

Any node of the network 800 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system (e.g. computer 850) includes a processor 808 (e.g. a processor core, a microprocessor, a computing device, etc), a main memory (e.g. computer memory 810) and a static memory 812, which communicate with each other via a bus 814. The computer 850 may further include a display unit (e.g. computer display 816) that may comprise a touch-screen, or a liquid crystal display (LCD), or a light emitting diode (LED) display, or a cathode ray tube (CRT). As shown, the computer system also includes a human input/output (I/O) device 818 (e.g. a keyboard, an alphanumeric keypad, etc), a pointing device 820 (e.g. a mouse, a touch screen, etc), a drive unit 822 (e.g. a disk drive unit, a CD/DVD drive, a tangible computer readable removable media drive, an SSD storage device, etc), a signal generation device 828 (e.g. a speaker, an audio output, etc), and a network interface device 830 (e.g. an Ethernet interface, a wired network interface, a wireless network interface, a propagated signal interface, etc).

The drive unit 822 includes a machine-readable medium 824 on which is stored a set of instructions (i.e. software, firmware, middleware, etc) 826 embodying any one, or all, of the methodologies described above. The set of instructions 826 is also shown to reside, completely or at least partially, within the main memory and/or within the processor 808. The set of instructions 826 may further be transmitted or received via the network interface device 830 over the network bus 814.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method for presenting an expandable display advertisement on a computer display, comprising:
  storing, within an ad server memory, an expandable display advertisement, the expandable display advertisement comprising an object identifier information to associate with a content server;
  storing, within the ad server, configuration information of a frame containing the expandable display advertisement, wherein the configuration information is registered once per impression and stored in a code library within the ad server; and
  calling, by the expandable display advertisement, one or more API calls, comprising at least a Register call, for use in receiving, from the content server, a response to an expansion event request to re-display the expandable display advertisement on the client system display, wherein receiving is performed after signaling, from a client system display, an expansion event request, and wherein a result of the Register call comprises registration of the frame and of the expandable display advertisement itself with the code library.

2. The method of claim 1, further comprising:

expanding, on the client system display, the expandable display advertisement, within bounds, for the frame, determined from initial dimension information of the frame and delta dimension information of the frame; and signaling, from the client system display, a restoring event request to re-display the expandable display advertisement on the client system display, within bounds, of the frame, determined from initial dimension information of the frame.

3. The method of claim 1, wherein the ad server is within a first domain, and the content server is within a second domain, wherein the second domain is different from the first domain, and wherein the ad server communicates to the client system display indirectly through the second domain.

4. The method of claim 1, wherein the configuration information of the expandable display advertisement includes at least a first width of the expandable display advertisement and a first height of the expandable display advertisement.

5. The method of claim 1, wherein the response to the expansion event request comprises at least a width delta expansion dimension of the expandable display advertisement and a height delta expansion dimension of the expandable display advertisement determined from initial dimension information of the frame and delta dimension information of the frame.

6. The method of claim 1, wherein the object identifier information includes at least one of a uniform resource locator (URL), and a uniform resource indicator (URI).

7. An advertising server network for presenting an expandable display advertisement on a client system display, comprising:

at least one processor and memory, for storing, within an ad server memory, an expandable display advertisement, the expandable display advertisement comprising an object identifier information to associate with a content server;

storing, within the ad server, configuration information of a frame containing the expandable display advertisement, wherein the configuration information is registered once per impression and stored in a code library within the ad server; and calling, by the expandable display advertisement, one or more API calls, comprising at least a Register call, for use in receiving, from the content server, a response to an expansion event request to re-display the expandable display advertisement on the client system display, wherein receiving is performed after signaling, from a client system display, an expansion event request, and wherein a result of the Register call comprises registration of the frame and of the expandable display advertisement itself with the code library.

8. The advertising server network of claim 7, further comprising:

at least one of, a script library, an advertising serving module, a served policy file, an advertising template.

9. The advertising server network of claim 7, further comprising:

a module configured to perform, after receiving of the expansion event request, resizing the display advertisement, recomposing the content of the display advertisement and recording event information related to the received expand request for subsequent analysis;

a module configured to expand, on the client system display, the expandable display advertisement, within bounds, for the frame, determined from initial dimension information of the frame and delta dimension information of the frame; and a module configured to signal, from the client system, a restoring event request to re-display the expandable display advertisement on the client system display, within bounds, of the frame, determined from initial dimension information of the frame.

10. The advertising server network of claim 7, wherein the ad server is within a first domain, and the content server is within a second domain, wherein the second domain is different from the first domain, and wherein the ad server communicates to the client system display indirectly through the second domain.

11. The advertising server network of claim 7, wherein the configuration information of the expandable display advertisement includes at least a first width of the expandable display advertisement and a first height of the expandable display advertisement.

12. The advertising server network of claim 7, wherein the response to the expansion event request comprises at least a width delta expansion dimension of the expandable display advertisement and a height delta expansion dimension of the expandable display advertisement determined from initial dimension information of the frame and delta dimension information of the frame.

13. The advertising server network of claim 7, wherein the object identifier information includes at least one of a uniform resource locator (URL), and a uniform resource indicator (URI).

14. A non-transitory computer readable medium comprising a plurality of sets of instructions which, when executed by a plurality of computers, cause the computers to present an expandable display advertisement on a computer display, the sets of instructions for:

storing, within an ad server memory, an expandable display advertisement, the expandable display advertisement comprising an object identifier information to associate with a content server;

storing, within the ad server, configuration information of a frame containing the expandable display advertisement, wherein the configuration information is registered once per impression and stored in a code library within the ad server; and calling, by the expandable display advertisement, one or more API calls, comprising at least a Register call, for use in receiving, from the content server, a response to an expansion event request to re-display the expandable display advertisement on the client system display, and wherein a result of the Register call comprises registration of the frame and of the expandable display advertisement itself with the code library.

15. The computer readable medium of claim 14, further comprising:

a set of instructions for expanding, on the client system display, the expandable display advertisement, within bounds, for the frame, determined from initial dimension information of the frame and delta dimension information of the frame; and a set of instructions for signaling, from the client system, a restoring event request to re-display the expandable display advertisement on the client system display, within bounds, of the frame, determined from initial dimension information of the frame.

16. The computer readable medium of claim 14, wherein the ad server is within a first domain, and the content server is within a second domain, wherein the second domain is different from the first domain, and wherein the ad server communicates to the client system display indirectly through the second domain.

17. The computer readable medium of claim 14, wherein the configuration information of the expandable display advertisement includes at least a first width of the expandable display advertisement and a first height of the expandable display advertisement.

18. The computer readable medium of claim 14, wherein the response to the expansion event request comprises at least a width delta expansion dimension of the expandable display advertisement and a height delta expansion dimension of the expandable display advertisement determined from initial dimension information of the frame and delta dimension information of the frame.

19. The method of claim 1, wherein the configuration information of a frame containing the expandable display advertisement includes initial dimension information of the frame and delta dimension information of the frame.

20. The method of claim 19, wherein the delta dimension information of the frame includes at least one dimension value, and wherein a sign of the dimension value indicates a direction of expansion of the frame.

* * * * *